US007634512B2

(12) United States Patent
Cao et al.

(10) Patent No.: US 7,634,512 B2
(45) Date of Patent: Dec. 15, 2009

(54) MIGRATING TEMPORARY DATA OF A SESSION

(75) Inventors: Yujie Cao, Redwood Shores, CA (US);
Tugrul Bingol, Foster City, CA (US);
Geeta Arora, Union City, CA (US);
Harmeek Singh Bedi, Foster City, CA (US); Susan M. Kotsovolos, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 344 days.

(21) Appl. No.: 11/732,844

(22) Filed: Apr. 4, 2007

(65) Prior Publication Data

US 2008/0098048 A1 Apr. 24, 2008

Related U.S. Application Data

(60) Provisional application No. 60/853,271, filed on Oct. 20, 2006.

(51) Int. Cl.
*G06F 17/30* (2006.01)
(52) U.S. Cl. .................... 707/202; 707/203; 713/182
(58) Field of Classification Search .............. 707/102, 707/202, 204; 709/229; 713/182; 726/6
See application file for complete search history.

(56) References Cited

U.S. PATENT DOCUMENTS

| 6,094,684 | A * | 7/2000 | Pallmann ............... 709/227 |
| 6,145,121 | A | 11/2000 | Levy et al. |
| 6,167,405 | A * | 12/2000 | Rosensteel et al. ........ 707/102 |
| 6,769,054 | B1 | 7/2004 | Sahin et al. |
| 6,775,826 | B1 | 8/2004 | Zahavi et al. |
| 6,813,731 | B2 | 11/2004 | Zahavi et al. |

(Continued)

FOREIGN PATENT DOCUMENTS

EP  1 610 238 A2  12/2005

(Continued)

OTHER PUBLICATIONS

"5 Schema Objects" downloaded from the internet Apr. 12, 2007 < http://oracle-docs.dartmouth.edu/dba-docs/10gdoc/server.101/b10743/schema.htm > pp. 11-14.

(Continued)

*Primary Examiner*—Shahid A Alam
(74) *Attorney, Agent, or Firm*—Hickman Palermo Truong & Becker LLP; Daniel D. Ledesma

(57) ABSTRACT

A technique for migrating (e.g., "copying" or "moving") temporary data from one session to another session is provided. While executing a workload associated with a particular session, session state is created. A subset of the session state comprises large objects that are referred to as "temporary data." Thus, temporary data is stored in a database (instead of in the database server) and is normally deleted when the particular session is deleted. To avoid this deletion when the session state is migrated to a different session, the temporary data, in one embodiment, is saved in an external storage that is separate from the database. An external table is created in the external storage and stores the temporary data. Location information to access the external table is provided to the other session.

21 Claims, 3 Drawing Sheets

U.S. PATENT DOCUMENTS

| | | | |
|---|---|---|---|
| 6,877,095 B1 * | 4/2005 | Allen | 713/182 |
| 7,194,761 B1 * | 3/2007 | Champagne | 726/6 |
| 7,415,522 B2 * | 8/2008 | Kaluskar et al. | 709/227 |
| 2004/0015600 A1 | 1/2004 | Tiwary et al. | |
| 2004/0221115 A1 | 11/2004 | Sahin et al. | |
| 2005/0038849 A1 * | 2/2005 | Kaluskar et al. | 709/203 |
| 2005/0055383 A1 | 3/2005 | Dias et al. | |
| 2005/0186975 A1 * | 8/2005 | Yach et al. | 455/466 |

FOREIGN PATENT DOCUMENTS

| | | |
|---|---|---|
| WO | WO 02/097664 A1 | 12/2002 |
| WO | WO 03/005202 A1 | 1/2003 |
| WO | WO 03/009139 A1 | 1/2003 |

OTHER PUBLICATIONS

"6 Application Builder Concepts" downloaded from the Internet Apr. 12, 2007 < http://oracle-docs.dartmouth.edu/dba-docs/10gdoc/appdev.101/b10992/mvl_fund. htm > p. 11.

Dias, K., et al., "Automatic Performance Diagnosis and Tuning in Oracle", XP-002470748, CIDR Conference, 2005, 12 pages.

European Patent Office, "International Search Report", PCT/US2007/081966, dated Mar. 11, 2008, 14 pages.

Claims, PCT/US2007/081966, 6 pages.

* cited by examiner

MIGRATING TEMPORARY DATA OF A SESSION

CLAIM OF PRIORITY

The present application incorporates by reference, and claims domestic priority under 35 U.S.C. §119(e) to, U.S. Provisional Patent Application No. 60/853,271, which is titled "DATABASE WORKLOAD CAPTURE AND REPLAY ARCHITECTURE" and was filed on Oct. 20, 2006.

FIELD OF THE INVENTION

The present invention relates to databases, and in particular, to migrating temporary data of one session to another session.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Large business-critical applications are complex and experience highly varying load and usage patterns. These applications are expected to provide certain service guarantees in terms of response time, throughput, uptime, and availability. At times, it may be desirable to change a system that includes such applications. Such a change might involve upgrading the system's database or modifying a configuration, for example. However, before any change is made to a production system, extensive testing and validation should be performed in a test system. In order to be confident that a change will not cause problems (e.g., errors or performance issues) in the production system once that change is introduced into the production system, a system tester should try to expose the test system to a workload that is very similar to the workload that the production system would actually experience in a real world environment.

Previous testing approaches have been inadequate because none of these previous testing approaches has been able to replicate a real production workload in a test system. According to one approach, a set of test scripts is written to test commonly executed code paths. Although this approach can be useful for performing regression testing and functional testing, this approach does not mimic a production workload. This approach usually stresses the testing system only to a very minimal extent.

Under another approach, human users are asked to use the test system as though the test system were a production system. However, this approach is very random and non-deterministic. This approach often fails to reproduce the load patterns that would be experienced in an actual production environment.

Under one possible approach, a workload from a production system may be migrated (e.g., copied) from the production system to a test system. Essentially, the session state of one or more sessions is captured on the production system and restarted on the test system. One issue that may arise in the context of a session, however, is that when a session is terminated, all data specific to that session (referred to hereinafter as "session state") is deleted.

Depending on its size, a portion of the session state may be stored on disk rather than in memory where a majority of session state is stored. The area on disk where a portion of session state is stored is referred to hereinafter as the "temporary segment." The portion of session state that is stored in a temporary segment is referred to hereinafter as "temporary data." Temporary data may include temporary tables, temporary indexes created on temporary tables, and temporary large objects (LOBs). A temporary segment is not allocated of the temporary data can be stored in memory.

What is needed is a technique that accounts for temporary data in order to avoid loss of such data when a session is terminated and the associated session data is migrated to another session.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
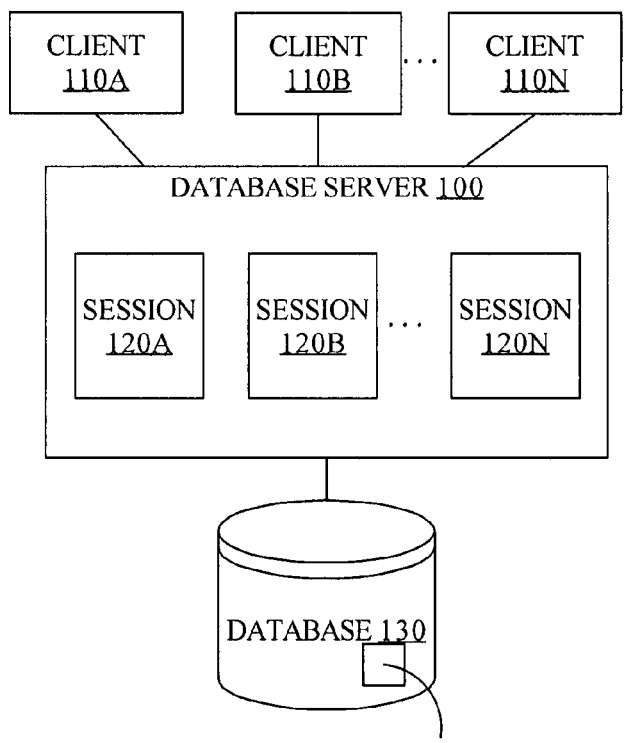
FIGS. 1A-B are block diagrams that illustrate how temporary data of a session may be migrated from one session to another session, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for migrating temporary data (i.e., a portion of session state that is stored on disk) from one session to another session. The session from which session data is migrated is referred to hereinafter as the "first session." The session to which session data is migrated is referred to hereinafter as the "second session."

A "session" is the period of time from when a user connects to a database server to when that user disconnects from the database server. "Session state" comprises any data and processes that are generated with respect to that user at a specific point in time during a session. Session state may exclude data and processes that have been generated with respect to a user but that are no longer required or used.

The area in memory of a database server in which session state is stored is referred hereinafter as the "session area;" for example, a "first session area" for the first session and a "second session area" for the second session. "Session area" may also include space allocated on disk (i.e., in the associated database) for the particular session. Technically, session state is migrated from the first session area to the second session area. However, for the purposes of the following description, it is equivalent to say that the session state is migrated from the first session to the second session.

In response to an instruction to migrate the session state from the first session to the second session, temporary data is stored in a storage container that may be different than the database in which the temporary data is stored. If the storage container is separate from the database, then an external table is created in the storage container. The temporary data is maintained in the external table and may be accessed from the external table.

Also in response to the instruction to migrate the session state, location information is sent to the process that "executes" the second session. A process that "executes" a session is a process that receives user requests, generates session state, and/or requests data from the database. A process that executes a session is referred to hereinafter as a "session process"; for example, a "first session process" for the first session and a "second session process" for the second session. Multiple processes may execute a single session, but for the sake of simplicity, only a single process for a session is described.

The second session process uses the location information to access the temporary data. For example, if an external table is created, then the location of where the external table is stored is sent to the second session process to enable the second session process to access the temporary data via the external table.

Migrating Temporary Data

Unsurprisingly, in order to migrate session state from a first session to a second session, all data associated with the first session should be accounted for in the migration; else, an error is likely to occur when the second session process executes the second session.

A database is normally managed by a non-distributed database server. However, a database server may be distributed among a plurality of nodes, in which case a database instance executes on each node. Therefore, multiple instances may be started for a single database, e.g., when using RAC (or Real Application Clusters), which is developed by Oracle.

A database server may receive an instruction to migrate session state, i.e., including the temporary data, from the first session area to the second session area. The second session area may be on the same database server as the first session area or on a different database server.

In response to the instruction to migrate the session state, the temporary data is stored in a particular location within a storage container that is accessible to the second session process. In one embodiment, the storage container is the database in which the temporary data is currently stored. In this embodiment, the temporary data may reside in the same location on disk. However, that location information still needs to be communicated to the second session process since the second session process initially knows nothing about the session state.

In another embodiment, the storage container is separate from the database, such as a file system associated with the database. A storage container that is separate from the database is referred to hereinafter as "external storage."

The location of where the temporary data is stored in the storage container is sent to the second session process. The second session process uses the location information to access all or a subset of the temporary data.

In one embodiment, the location information of the temporary data (and, e.g., any other session data that was stored in memory) is communicated from the first session process to the second session process. Alternatively, a database server process other than the first session process may be responsible for sending the location information of the temporary data to the second session process.

External Tables

In one embodiment, if the storage container is external storage, then an external table is created in the external storage. Fundamentally, an external table is a table that is not stored in a database. Thus, the actual temporary data is "dumped" or saved in an external table that is stored in external storage (e.g., file system). After the temporary data is dumped to the external storage, the temporary data becomes "external data"—external from the viewpoint of the database server. One can think of an external table as a view that allows, e.g., SQL queries to be run against external data without requiring that the external data to be first loaded into the database.

External data in the external table may be loaded via an access driver (e.g., an ORACLE_LOADER). The access driver is an API that interprets the data in the external table for the database.

The location information sent to the second session process may include a handle to the external table, instead of a mere pointer. A handle is an abstract reference that allows the referent (i.e., the external table in this case) to be relocated in the memory of the external storage without invalidating the handle.

The process of creating an external table and storing the temporary data in a different storage container may be performed in response to an export command. Likewise, the second session process may access the external data using an import command.

Metadata of Temporary Data

In many cases, temporary tables and temporary LOBs are associated with metadata. Examples of metadata for a temporary table include the names of the columns of the temporary table and the datatype associated with each column. An example of metadata for a temporary LOB is a reference count that increments each time the temporary LOB is referenced. Such a reference count avoids creating unnecessary copies of the temporary LOB.

Metadata of temporary data is typically stored in the session-specific area of memory of the database server rather than being stored on disk because the metadata is relatively small in size, and thus does not occupy a significant amount of server memory. If temporary LOBs are migrated without its associated metadata, then the second session process will not be able to make sense of the temporary LOBs. Therefore, the associated metadata may also be stored with the temporary LOBs. The same is not true for temporary tables because the metadata of a temporary table is already part of a database schema, similar to non-temporary (e.g., "regular") tables.

For example, in one embodiment, if temporary LOBs are stored in an external table, then the associated metadata is also stored in the external table. As another example, the metadata of temporary LOBs may be stored in the same directory of external storage as the directory in which the temporary LOBs are stored.

Example of Migrating Temporary Data

Figure 1B:
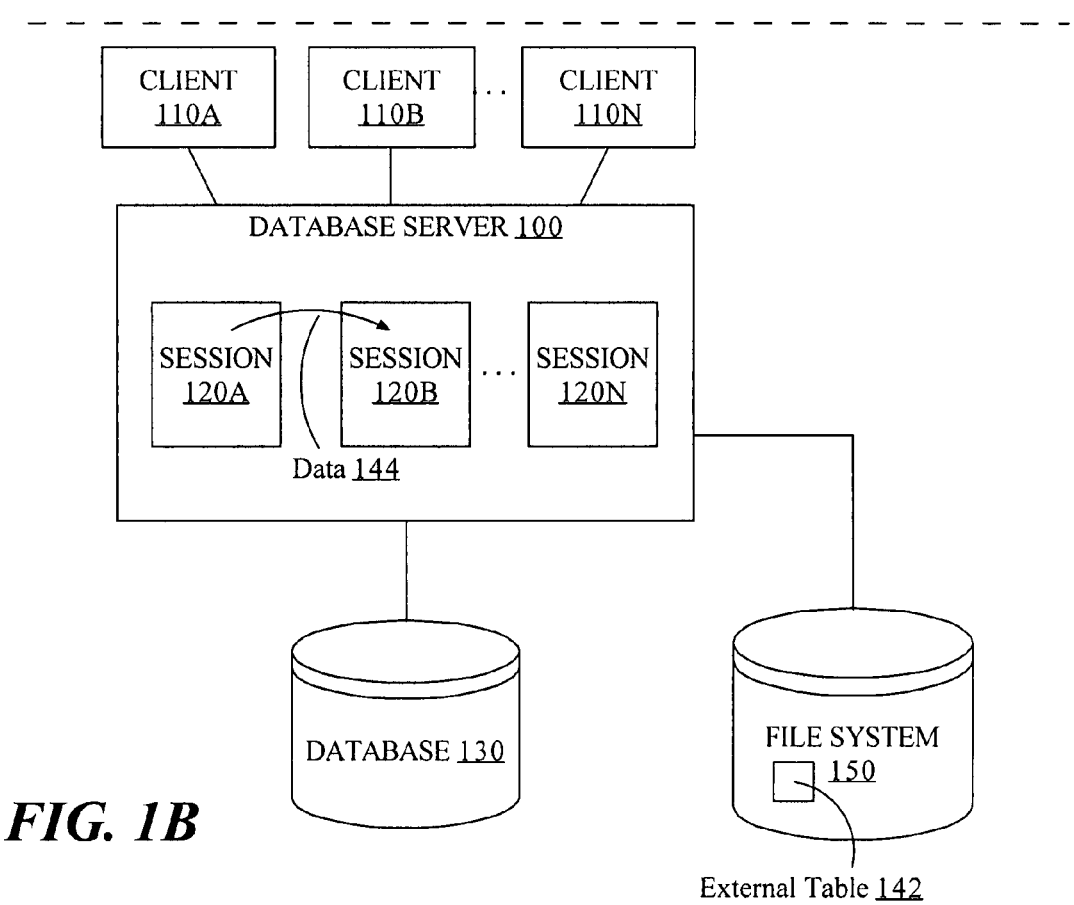

FIGS. 1A-B are block diagrams that illustrate how temporary data of a session 120A may be migrated from session 120A to a session 120B, according to an embodiment of the invention. The example shown in FIG. 1A includes clients 110A-N, a database 130, and a database server 100 that provides access to database 130. In the following description, each of sessions 120A-N refers either to a session (i.e., period of time) or a session area.

Clients 110A-N may be separate computers or separate processes that execute on the same computer. For example, in one embodiment of the invention, clients 110A-N are Internet browsers (e.g., Mozilla Firefox) that execute on separate computers that are communicatively coupled to the Internet.

As FIGS. 1A-B illustrate, multiple clients 110A-N may be communicatively coupled to database server 100, e.g., through a wireless network. However, multiple clients are not required for embodiments of the invention.

Clients 110A-N establish sessions 120A-N, respectively, with database server 100 in order to retrieve data from and/or store data to database 130. Thus, session 120A is established for client 110A, session 120B is established for client 110B, and so forth. Within these respective sessions, clients 110A-N send database commands to database server 100. Such database commands may include Structured Query Language (SQL) select statements, for example. Database server 100 executes these database commands relative to database 130. As a result of executing these database commands, database server 100 may store data in, and/or retrieve data from, database 130. Database server 100 may execute two or more database commands in a transactional manner, so that none of the effects of the database commands in a single transaction are made permanent in database 130 unless all of the effects of those database commands can be made permanent. Database server 100 may return, to clients 110A-N, data retrieved from database 130 as a result of the execution of certain database commands (e.g., SQL select statements).

When a connection is established between database server 100 and, e.g., client 110A, a space in memory of database server 100 is allocated (i.e., session 120A) to hold data and processes that are required to execute the database command. When the connection is terminated (e.g., at the end of a session or due to a software failure), the space allocated to session 120A is freed to be used by other clients in different sessions and/or by system processes.

Figure 2A:
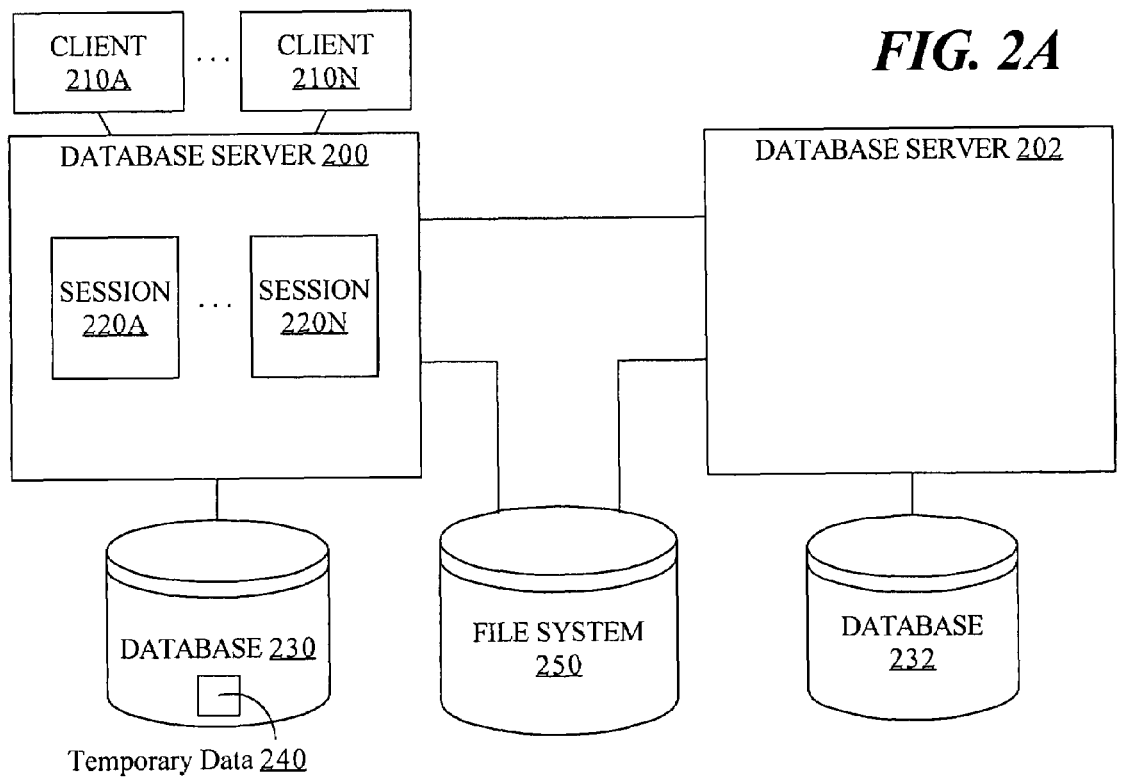
FIGS. 2A-B are block diagrams that illustrate a similar migration except where the second session is located on a different database server, according to an embodiment of the invention.
Figure 2B:
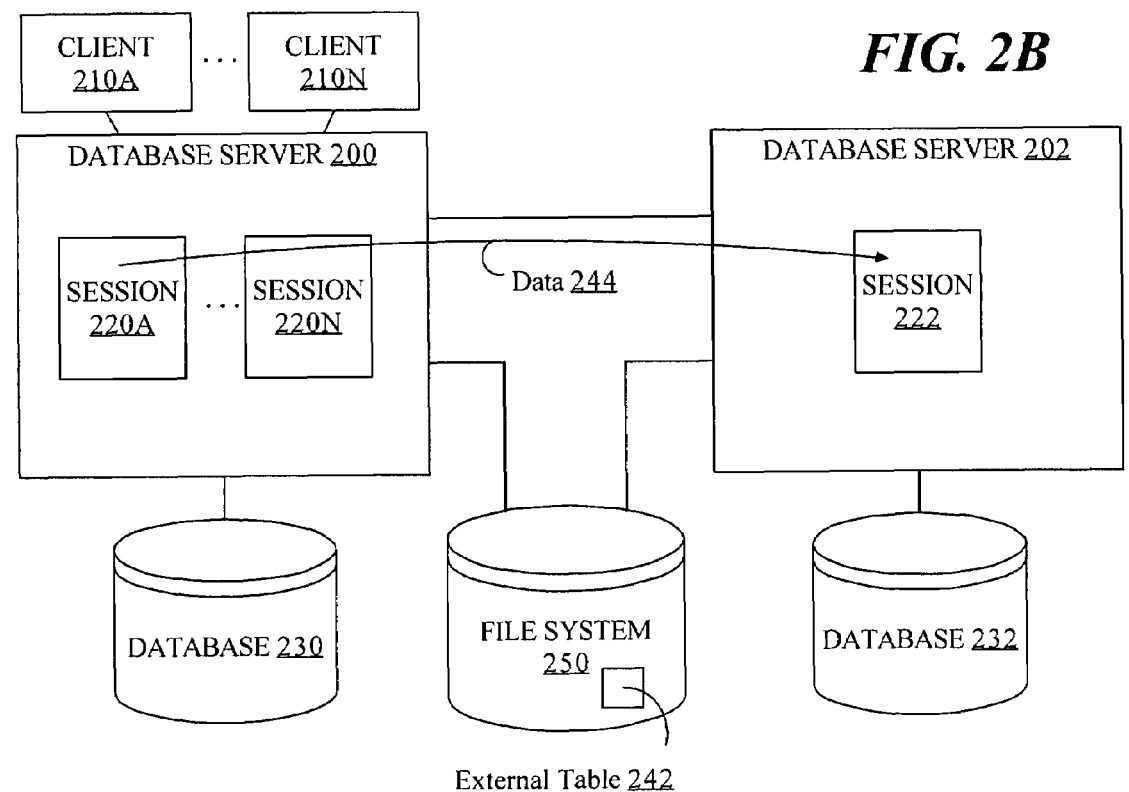

In this example, sessions 120A and 120B are established on the same database server 100. However, as FIGS. 2A-B illustrate, the first session and the second session may be established on different database servers.

FIG. 1A indicates that session 120B may have been established before an instruction to migrate session data from session 120A to session 120B has been received. However, in one embodiment of the invention, session 120B is not established (e.g., memory allocated for session 120B) until after the instruction is received.

In FIG. 1A, client 110 establishes a connection with database server 100. Memory for session 120A is allocated in database server 100. During execution of a workload initiated by client 110A, session state is created, some of which is stored in database 130 as temporary data 140.

An instruction is later received to migrate the session state, associated with session 120A, to session 120B. The instruction may be received from one of clients 110A-N or some other entity not illustrated.

FIG. 1B illustrates that, in response to the instruction, temporary data 140 is maintained in an external table 142 that is stored in a file system 150 (an example of external storage). Other data 144 associated with session 120A is migrated or copied from session 120A to session 120B. In one embodiment, data 144 includes location information of where external table 142 is located in file system 150. Data 144 may also include all session state of session 120A that is stored in memory. A process executing session 120B uses the location information to access temporary data 140 that is stored in external table 142 and, optionally, metadata associated with the temporary data 140.

Example of Migrating Temporary Data to a Session in a Different Database Server

FIGS. 2A-B are block diagrams that illustrate a similar migration except, in this example, the second session is located in a different database server, according to an embodiment of the invention. Similar to FIG. 1A, there may be multiple clients 210A-N connected to a database server 200 that manages a database 230. In addition to FIG. 1A, FIG. 2A illustrates that database server 200 is communicatively coupled to a different database server 202 that manages a database 232.

In this example, after a connection is established between client 210A and database server 200, database server 200 allocates memory for a session 220A to hold session state that is associated with the workload initiated by client 210A. During execution of the workload, session state is created, some of which is stored in database 230 as temporary data 240.

An instruction is received to migrate the session state of session 220A to another session executing on database server 202. In response to the instruction, memory in database server 202 is allocated for a session 222 to hold the session state of session 220A. Also, temporary data 240 is stored in an external table 242 in a file system 250. Other data 244 associated with session 220A is migrated or copied from session 220A to session 222. In one embodiment, data 244 includes location information of where external table 242 is located in file system 250. A process executing session 222 uses the location information to access temporary data 240 that is stored in external table 242 and, optionally, metadata associated with the temporary data 240.

The above examples illustrate how session state is migrated from one session to only one other session. However, according to an embodiment of the invention, session state from one session may be migrated to multiple session serially or simultaneously in order to test multiple test systems at once. Thus, the temporary data is copied and stored in different locations of one or more storage containers—one location for each "receiver" session. Appropriate location information is sent to the corresponding receiver session so that the process that executes the corresponding receiver session may access the temporary data at the appropriate location.

Also, the session state from multiple session areas may be migrated to multiple other session areas executing on (1) the same database server, (2) a different database server, or (3) multiple different database servers.

Hardware Overview

Figure 3:
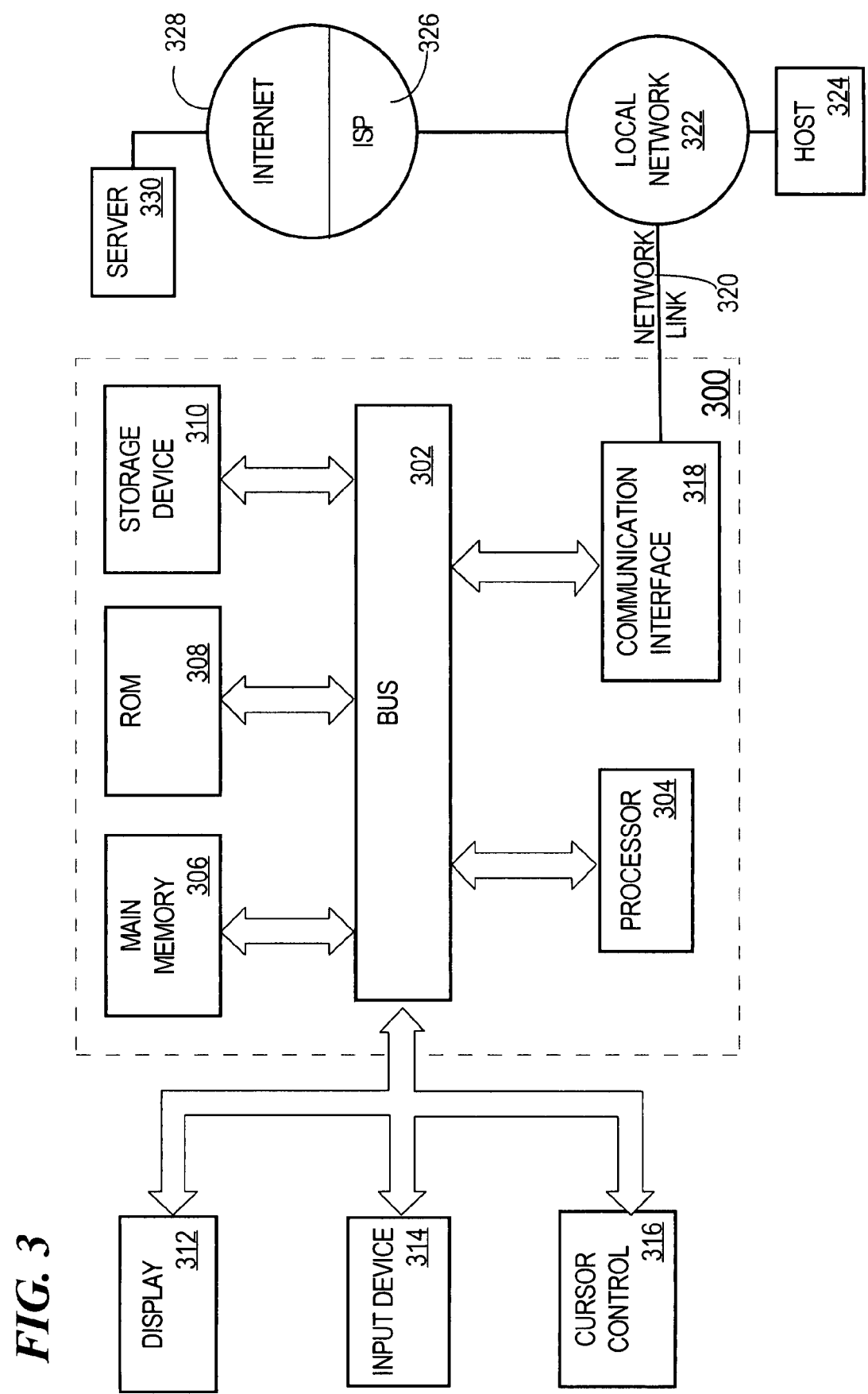
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for migrating session state, that is specific to a first session, from the first session to a second session, the method comprising:

while executing a workload associated with the first session, a first process generating the session state, wherein the session state includes temporary data, at least a portion of which is stored in a database, wherein the database is associated with a database server that manages data stored in the database, wherein the session state includes data that is stored in memory of the database server that is separate from the database;

receiving an instruction to migrate at least a portion of the session state from a first session area associated with the first session to a second session area associated with the second session, wherein the second session area is in memory of a second database server that is either the same as or different than the database server; and after receiving the instruction, storing the temporary data in a particular location of a storage container; and sending, to the second session area, location information that identifies the particular location;

wherein a second process that executes the second session uses the location information to access at least a subset of the temporary data that is stored in the storage container.

2. The method of claim 1, wherein, while executing the workload, none of the temporary data is stored in the memory of the database server.

3. The method of claim 1, wherein the temporary data include temporary large objects (LOBs) and temporary tables.

4. The method of claim 1, wherein:

the storage container is separate from the database;

the method further comprising creating an external table in the storage container;

the external table stores the temporary data; and the location information includes an identifier that is used to access the external table.

5. The method of claim 1, further comprising:

before receiving the instruction, storing metadata, that is associated with the temporary data, in the memory of the database server; and in response to receiving the instruction, storing said metadata in the storage container;

wherein the second process uses the location information to access metadata that corresponds to said subset of the temporary data.

6. The method of claim 1, wherein the second session executes on a second database server that is different than the database server, wherein the second database server manages a second database that is different than the database.

7. The method of claim 1, wherein:

the instruction includes an instruction to migrate the session state from the first session to a plurality of sessions, one of which is the second session;

the temporary data is stored in a different location of one or more storage containers;

sending the location information to the second session includes sending different location information to each session of the plurality of sessions, wherein each different location information corresponds to a different session of the plurality of sessions; and a different process for each session of the plurality of sessions uses the corresponding location information to access at least a subset of the temporary data that is stored in one of the one or more storage containers.

8. An apparatus for migrating session state, that is specific to a first session, from the first session to a second session, the apparatus comprising:

a database;

a database server that manages data stored in the database;

one or more processors;

one or more stored sequences of instructions which, when executed by the one or more processors, cause the one or more processors to perform the steps of:

while executing a workload associated with the first session, a first process generating the session state that includes temporary data, wherein at least a portion of the temporary data is stored in the database, wherein the session state includes data that is stored in memory of the database server;

receiving an instruction to migrate at least a portion of the session state from a first session area associated with the first session to a second session area associated with the second session, wherein the second session area is in memory of a second database server that is either the same as or different than the database server; and after receiving the instruction, storing the temporary data in a particular location of a storage container; and sending, to the second session area, location information that identifies the particular location;

wherein a second process associated with the second session uses the location information to access at least a subset of the temporary data that is stored in the storage container.

9. The apparatus of claim 8, wherein, while executing the workload, none of the temporary data is stored in the memory of the database server.

10. The apparatus of claim 8, wherein the temporary data include temporary large objects (LOBs) and temporary tables.

11. The apparatus of claim 8, wherein:

the storage container is separate from the database;

the one or more stored sequences of instructions, when executed by the one or more processors, further cause the one or more processors to perform the step of creating an external table in the storage container;

the external table stores the temporary data; and the location information includes an identifier that is used to access the external table.

12. The apparatus of claim 8, wherein the one or more stored sequences of instructions, when executed by the one or more processors, further cause the one or more processors to perform the steps of:

before receiving the instruction, storing metadata, that is associated with the temporary data, in the memory of the database server; and in response to receiving the instruction, storing the metadata in the storage container;

wherein the second process uses the location information to access metadata that corresponds to said subset of the temporary data.

13. The apparatus of claim 8, further comprising a second database and a second database server that manages the second database, wherein a portion of the session state is stored in the second database server.

14. The apparatus of claim 8, wherein:

the instruction includes an instruction to migrate the session state from the first session to a plurality of sessions, one of which is the second session;

the temporary data is stored in a different location of one or more storage containers;

sending the location information to the second session includes sending different location information to each session of the plurality of sessions, wherein each different location information corresponds to a different session of the plurality of sessions; and a different process for each session of the plurality of sessions uses the corresponding location information to access at least a subset of the temporary data that is stored in one of the one or more storage containers.

15. One or more storage media storing instructions for migrating session state, that is specific to a first session, from the first session to a second session, wherein the instructions, when executed by one or more processors, cause:

while executing a workload associated with the first session, a first process generating the session state, wherein the session state includes temporary data, at least a portion of which is stored in a database, wherein the database is associated with a database server that manages data stored in the database, wherein the session state includes data that is stored in memory of the database server that is separate from the database;

receiving an instruction to migrate at least a portion of the session state from a first session area associated with the first session to a second session area associated with the second session, wherein the second session area is in memory of a second database server that is either the same as or different than the database server; and after receiving the instruction, storing the temporary data in a particular location of a storage container; and sending, to the second session area, location information that identifies the particular location;

wherein a second process that executes the second session uses the location information to access at least a subset of the temporary data that is stored in the storage container.

16. The one or more storage media of claim 15, wherein, while executing the workload, none of the temporary data is stored in the memory of the database server.

17. The one or more storage media of claim 15, wherein the temporary data include temporary large objects (LOBs) and temporary tables.

18. The one or more storage media of claim 15, wherein:

the storage container is separate from the database;

wherein the instructions include additional instructions which, when executed by the one or more processors, further cause creating an external table in the storage container;

the external table stores the temporary data; and the location information includes an identifier that is used to access the external table.

19. The one or more storage media of claim 15, wherein the instructions include additional instructions which, when executed by the one or more processors, further cause:

before receiving the instruction, storing metadata, that is associated with the temporary data, in the memory of the database server; and in response to receiving the instruction, storing said metadata in the storage container;

wherein the second process uses the location information to access metadata that corresponds to said subset of the temporary data.

20. The one or more storage media of claim 15, wherein the second session executes on a second database server that is different than the database server, wherein the second database server manages a second database that is different than the database.

21. The one or more storage media of claim 15, wherein:

the instruction includes an instruction to migrate the session state from the first session to a plurality of sessions, one of which is the second session;

the temporary data is stored in a different location of one or more storage containers;

sending the location information to the second session includes sending different location information to each session of the plurality of sessions, wherein each different location information corresponds to a different session of the plurality of sessions; and a different process for each session of the plurality of sessions uses the corresponding location information to access at least a subset of the temporary data that is stored in one of the one or more storage containers.

* * * * *

UNITED STATES PATENT AND TRADEMARK OFFICE
CERTIFICATE OF CORRECTION

PATENT NO. : 7,634,512 B2
APPLICATION NO. : 11/732844
DATED : December 15, 2009
INVENTOR(S) : Yujie Cao et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 344 days.

In column 2, line 6, after "allocated" delete "of" and insert -- if --, therefor.

Signed and Sealed this

Fourteenth Day of September, 2010

David J. Kappos
*Director of the United States Patent and Trademark Office*